(12) United States Patent
Chiocco et al.

(10) Patent No.: US 9,710,771 B2
(45) Date of Patent: Jul. 18, 2017

(54) REAL-TIME CROP PROCESSING MANAGEMENT

(71) Applicant: Trimble Navigation Limited, Sunnyvale, CA (US)

(72) Inventors: Gregory Daniel Chiocco, Sunnyvale, CA (US); Guillermo Perez-Iturbe, Miami, FL (US)

(73) Assignee: Trimble Inc., Sunnyvale, CA (US)

( * ) Notice: Subject to any disclaimer, the term of this patent is extended or adjusted under 35 U.S.C. 154(b) by 475 days.

(21) Appl. No.: 14/176,967

(22) Filed: Feb. 10, 2014

(65) Prior Publication Data

US 2015/0227873 A1  Aug. 13, 2015

(51) Int. Cl.
*G06Q 10/00* (2012.01)
*G06Q 10/06* (2012.01)
*A01D 93/00* (2009.01)
*G06Q 50/02* (2012.01)

(52) U.S. Cl.
CPC ....... *G06Q 10/06312* (2013.01); *A01D 93/00* (2013.01); *G06Q 10/0631* (2013.01); *G06Q 10/06313* (2013.01); *G06Q 50/02* (2013.01)

(58) Field of Classification Search
CPC .. G06Q 10/08; G06Q 10/06; G06Q 10/06312; G06Q 10/06313; G06Q 10/0631; G06Q 50/02
See application file for complete search history.

(56) References Cited

U.S. PATENT DOCUMENTS

| 5,845,229 | A  | * | 12/1998 | Rawlins ............... | A01B 79/005 |
| | | | | | 702/2 |
| 6,671,698 | B2 | * | 12/2003 | Pickett ................. | A01B 79/005 |
| 6,691,135 | B2 | * | 2/2004 | Pickett ................. | A01B 79/005 |
| 7,016,764 | B2 | * | 3/2006 | Penkar ................. | G06Q 10/087 |
| | | | | | 700/214 |
| 7,080,051 | B1 | * | 7/2006 | Crawford ............... | G06F 8/61 |
| | | | | | 379/111 |
| 2002/0032497 | A1 | * | 3/2002 | Jorgenson ............. | A01B 79/00 |
| | | | | | 700/115 |
| 2002/0091593 | A1 | * | 7/2002 | Fowler ................. | G06Q 10/087 |
| | | | | | 705/28 |
| 2002/0095232 | A1 | * | 7/2002 | Jorgenson ............. | A01B 79/00 |
| | | | | | 700/99 |

(Continued)

OTHER PUBLICATIONS

Bochtis, "Machinery Management in Bio-Production Systems; Planning and Scheduling Aspects", Agric. Eng. Int: CIGR Journal, Jan. 1, 2010, 55-63.

(Continued)

*Primary Examiner* — Matthew Gart
*Assistant Examiner* — Stephen S Swartz
(74) *Attorney, Agent, or Firm* — Kilpatrick Townsend & Stockton LLP

(57) ABSTRACT

A real-time crop processing management system is disclosed. In one embodiment, a yield description of a load of harvested crop and a location of the load of harvested crop is received at a computer system. An indication of the capacity to process the load of harvested crop by a receiving facility is also received by the computer system. A message conveying a delivery assignment for the load of harvested crop is then generated by the computer system.

20 Claims, 6 Drawing Sheets

(56) References Cited

U.S. PATENT DOCUMENTS

| | | | |
|---|---|---|---|
| 2003/0018490 A1* | 1/2003 | Magers | G06Q 10/06 703/6 |
| 2003/0149608 A1* | 8/2003 | Kall | G06Q 10/06 705/7.27 |
| 2003/0182144 A1* | 9/2003 | Pickett | G06Q 10/06 705/317 |
| 2004/0148212 A1* | 7/2004 | Wu | G06Q 10/0631 705/7.12 |
| 2005/0004682 A1* | 1/2005 | Gaddis | A01D 91/00 700/9 |
| 2005/0216921 A1* | 9/2005 | Kataoka | G06F 9/44526 719/328 |
| 2009/0234695 A1* | 9/2009 | Kapadi | G06Q 10/04 705/7.13 |
| 2010/0125461 A1* | 5/2010 | Heald | G06Q 30/06 705/2 |
| 2013/0185104 A1* | 7/2013 | Klavins | G06Q 10/063 705/7.12 |
| 2013/0304614 A1 | 11/2013 | Christie et al. | |

OTHER PUBLICATIONS

Sorensen, "Conceptual Model of Fleet Management in Agriculture", Biosystems Engineering, Academic Press, UK. vol. 105, No. 1, Jan. 1, 2010, 41-50.

International Search Report for Application No. PCT/US2015/015021, mailed May 6, 2015, 4 pages.

International Written Opinion for Application No. PCT/US2015/015021, mailed May 6, 2015, 5 pages.

International Preliminary Report on Patentability for Application No. PCT/US2015/015021, mailed Aug. 25, 2016, 7 pages.

\* cited by examiner

500

---

RECEIVING AT A COMPUTER SYSTEM A YIELD DESCRIPTION OF A LOAD OF HARVESTED CROP, AND A LOCATION OF THE LOAD OF HARVESTED CROP
510

↓

RECEIVING BY THE COMPUTER SYSTEM AN INDICATIONN OF THE CAPACITY TO PROCESS THE LOAD OF HARVESTED CROP BY A RECEIVING FACILITY
520

↓

GENERATING BY THE COMPUTER SYSTEM A MESSAGE CONVEYING A DELIVERY ASSIGNMENT FOR THE LOAD OF HARVESTED CROP
530

FIG. 5

REAL-TIME CROP PROCESSING MANAGEMENT

BACKGROUND

Current agricultural practice is moving toward using technology to more precisely control what practices are to be implemented. This includes crop selection, planting schedules, fertilization and pest control, harvesting, etc. An important consideration is the transport, storage and processing of harvested crops. In particular, it is important to transport harvested crops to a storage facility or processing plant as soon as possible to reduce spoilage. For example, cut sugarcane loses a significant amount of its sugar content approximately 8 hours after harvest. Thus, if not processed within 8 hours of harvest, its value is significantly reduced, or it is rendered useless. Other crops for which perishability is an important consideration include fruits and vegetables which can spoil rapidly after being harvested.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

FIG. 5 is a flowchart of a method for managing crop processing in accordance with various embodiments.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Figure 1:
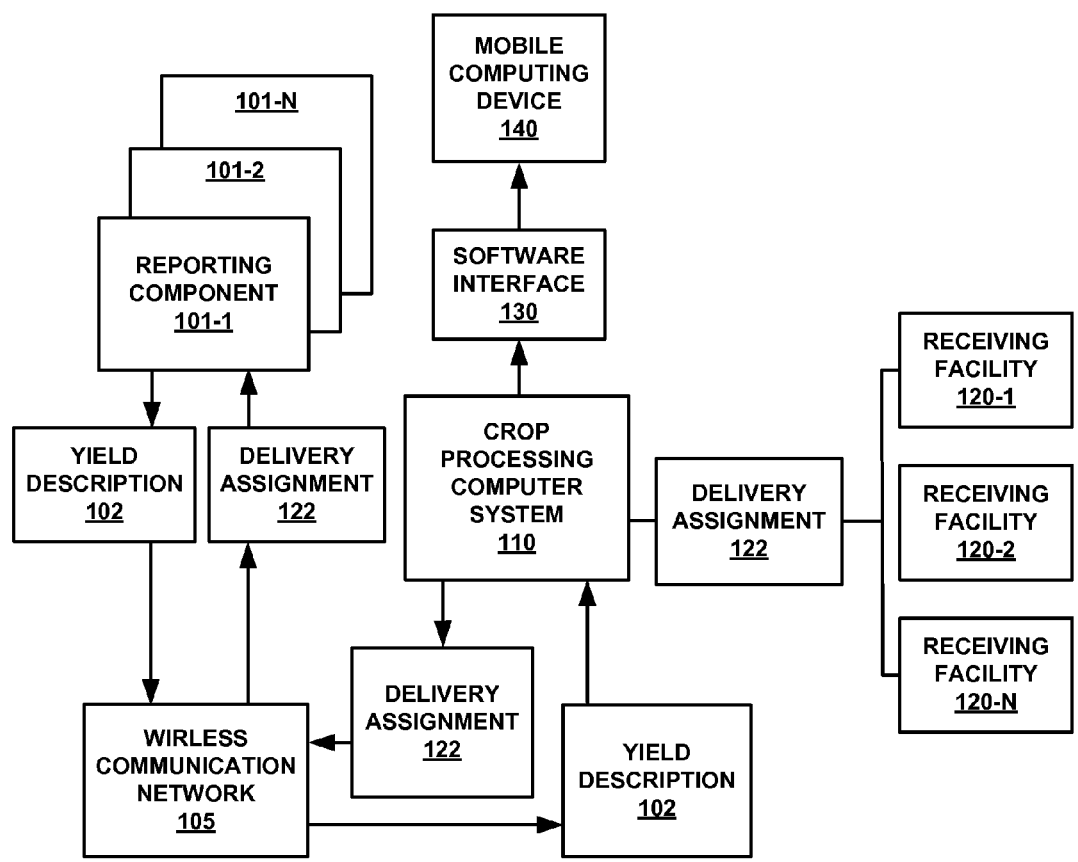
FIG. 1 is a block diagram of real-time crop processing network in accordance with various embodiments.

FIG. 1 is a block diagram of a real-time crop processing network 100 in accordance with various embodiments. In FIG. 1, network 100 comprises one or more reporting source(s) (e.g., 101-1, 101-2, 101-N). Reporting source(s) 101 generate a yield description 102 of a crop which is conveyed to wireless communication network 105. Wireless communication network 105 in turn conveys yield description 102 to a crop processing computer system 110 which is communicatively coupled with one or more receiving facilities (e.g., 102-1, 120-2, 120-N). In at least one embodiment, crop processing computer system 110 generates a delivery assignment 122 based upon data sent by receiving facilities 120. Delivery assignment 122 is then conveyed via wireless communication network 105 to one or more of receiving component(s) 101. It is noted that delivery assignment 122 does not have to be sent to the reporting component(s) which generated yield description 102.

In accordance with one embodiment, reporting component 101 is used to describe some metric of a harvested crop which facilitates generating a delivery assignment by crop processing computer system 110. Reporting component 101 can be a component of, or disposed upon, a harvesting device used to harvest the crop such as a combine. Metrics of a harvested crop which can be conveyed in yield description 102 include, but are not limited to, a volume of harvested crop, a weight of harvested crop, a moisture content of a harvested crop, a time a crop is harvested, a location at which the crop was harvested, the content of a specific constituent (e.g., the sugar content of a crop), a condition of the harvested crop (e.g., which can be manually entered by an operator of reporting component 101, or by another component such as mobile computing device 140), etc. Other reporting components 101 may be disposed upon, or a component of, a truck or trailer which is transporting the harvested crop to a receiving facility 120. Other reporting components 101 may be a component of, or disposed upon, a tractor which carries the harvested crop from a harvesting device to the truck or trailer which is transporting the harvested crop to a receiving facility 120. It is noted that the above discussion is for the purpose of examples of implementations of a reporting component 101 and is not intended to be a comprehensive listing.

In accordance with various embodiments, reporting component 101 can comprise either of a wireless communication transmitter, or transceiver operable to utilize any suitable wireless communication protocol including, but not limited to: WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and implementations of the Bluetooth® standard. Personal area networks refer to short-range, and often low-data-rate, wireless communications networks. In accordance with at least one embodiment, reporting component(s) 101 can also be configured with a store-and-forward capability which enables one reporting component (e.g., 101-1) to receive a yield description from a second reporting component (e.g., 101-2) and convey that yield description to wireless communication network 105. As described above, in at least one embodiment, delivery assignment 122 may be conveyed to a different reporting component 101 than the one which generated yield description 102. Thus, a first reporting component (e.g., 101-1) may comprise a transmitter only (e.g., disposed upon a harvesting device) which generates yield description 102 while a second reporting component (e.g., 101-2) comprises a wireless transceiver (e.g., disposed upon a truck or trailer transporting the harvested crop to a receiving facility 120) which generates a second yield description 102. It is noted that yield description 102 may be forwarded via more than one intermediary reporting component 101 in accordance with various embodiments and may also be forwarded by a device which is not a dedicated reporting component 101 such as mobile computing device 140 which has downloaded a software interface 130 from crop processing computer system 110. As an example, a farmer, supervisor, or employee at a farm can download software interface 130 onto their cellular telephone which permits them to communicate with crop processing computer system 110 via wireless communication network 105, or with a reporting component 101 to facilitate generating a yield description 102.

In accordance with one or more embodiments, wireless communication network 105 can comprise a direct communication link between reporting component 101 and crop processing computer system 110, or via intermediary devices such as antennas, repeaters, routers, or other reporting component(s) 101 as described above. For example, referring now to FIG. 2, a reporting component 101-1 disposed upon harvester 201 can generate a yield description 102 which can be sent directly to crop processing computer system 110. However, in the embodiment shown in FIG. 2, the reporting component 102-1 disposed on harvester 201 sends yield description 102 to the reporting component 101-2 disposed on a tractor 202. In the embodiment shown in FIG. 2, reporting component 101-2 stores yield description 122 while it carries the harvested crop to truck 203 which will carry the harvested crop to a receiving facility 120. In accordance with one embodiment, when the harvested crop is transferred from tractor 202 to truck 203, reporting component 101-2 will forward yield description 102 to reporting component 101-N which is disposed upon truck 203. In at least one embodiment, reporting component 101 can be configured to automatically detect another reporting component 101 in its vicinity and forward data such as yield report 102 to the reporting component(s) 101 which it detects. In another embodiment, a "handshaking" or login procedure can be implemented as well.

It is possible that the crop may be harvested and transported at least some of the way to receiving facility 120 outside of the coverage area of wireless communication network 105. Thus, in at least one embodiment, wireless communication network 105 can comprise antennas, repeaters, transceivers, and the like which facilitate forwarding yield description 102 to crop processing computer system 110 while the harvested crop is en-route to receiving facility 120. This equipment can be disposed upon, for example, utility poles, light poles, or within towns (e.g., a wireless router, or cellular network tower) through which the harvested crop is transported. Additionally, wireless communication network 105 can utilize existing reporting networks such as are used by utility networks, or other infrastructure. For example, some bridges and overpasses are equipped with sensors which detect and report the condition of the bridge via a wireless communication link. In one embodiment, reporting component 101 can use these existing communication networks to forward yield description 102 to crop processing computer system 110. In one embodiment, reporting component 101 is configured to automatically detect a connection with wireless communication network 105 and to forward yield description 102 upon establishing communications with crop processing computer system 110.

In various embodiments, receiving facility 120 (e.g., 120-1, 120-2, 120-N) is in communication with crop processing computer system 110 and report the current and/or projected capacity (e.g., via processing capacity message 205 of FIG. 2) for processing a load of a harvested crop. In accordance with at least one embodiment, crop processing computer system 110 can determine the current and/or projected capacity of a receiving facility 120 based upon raw data conveyed in processing capacity message 205. It is noted that in at least one embodiment, receiving facility 120 may be processing more than one type of harvested crop and that the capacity to process the harvested crop described in yield description 102 may be contingent upon the receiving facility 120 being able to process other types of crops before, or in parallel with, the processing of the harvested crop described in yield description 102. In accordance with various embodiments, the current capacity for processing the harvested crop comprises how much harvested crop has been received by the processing facility 120 which is waiting to be processed and/or the priority for processing that received crop. For example, with sugar cane, the value of the harvested crop drops considerably about 8 hours after it is harvested as the sugar content drops. Thus, if a particular receiving facility 120 has an abundance of harvested sugarcane which needs to be processed by a certain time, this can be conveyed to crop processing computer system 110 to facilitate prioritizing the delivery of a harvested crop to a different receiving facility 120 which may not be in such a time-sensitive state of operations. Alternatively, if a harvested crop is in a condition in which immediate processing is necessary, crop processing computer system 110 can facilitate the queue assignment of the truck carrying that load of harvested crop so that it is moved farther ahead in the processing queue. For example, in the case of a load of harvested sugar cane, if yield description 102 indicates that the load of cane was harvested 6 hours ago, crop processing computer system 110 can generate a queue assignment which moves that load of cane to the front of the processing queue so that it is processed before 8 hours have elapsed from the time of harvest and thus preserve the value of that load of cane.

Figure 2:
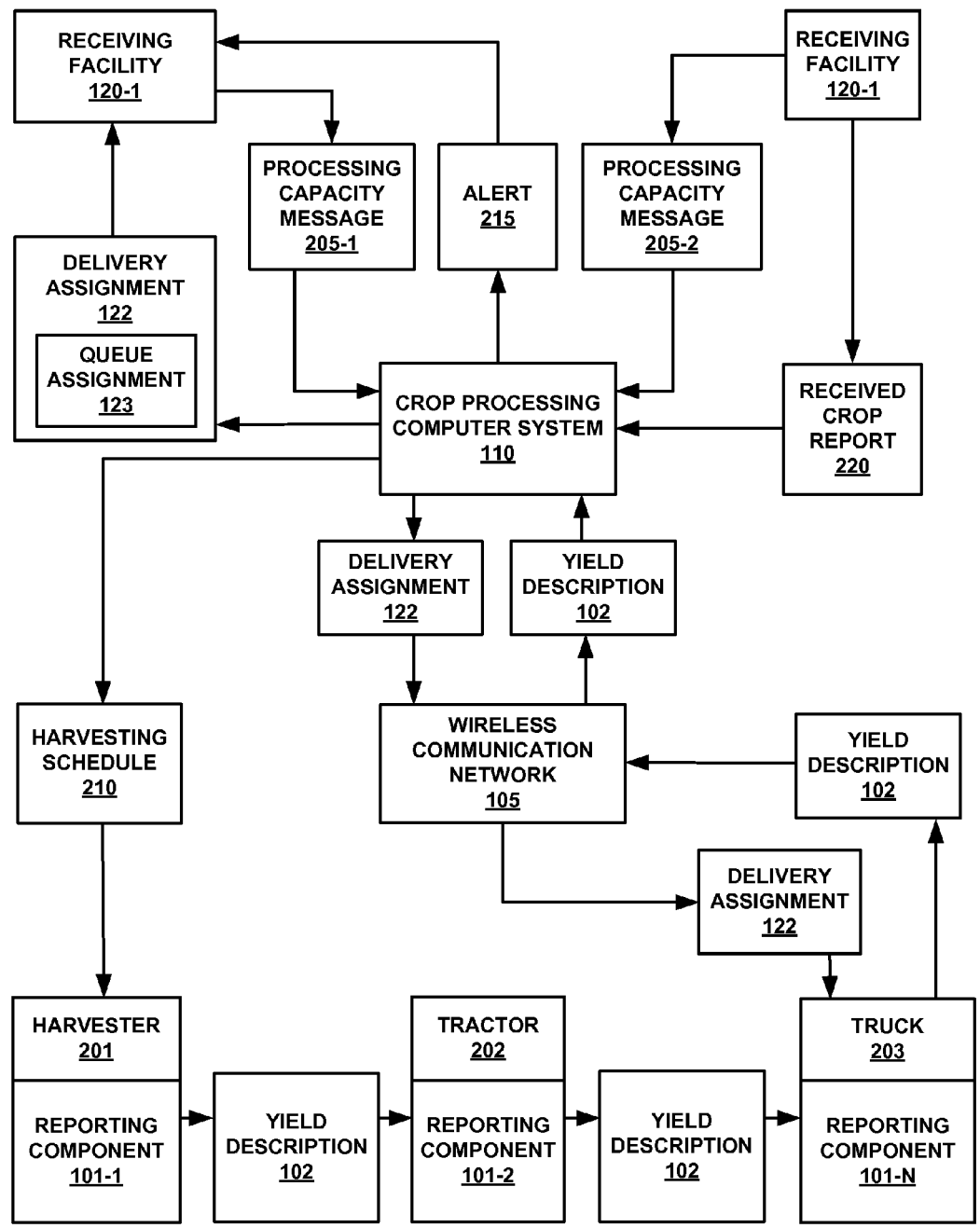
FIG. 2 is a block diagram showing the exchange of data in a real-time crop processing network in accordance with various embodiments.

In accordance with various embodiments, a queue assignment, or other information, is generated by crop processing computer system 110 and conveyed to reporting component 101 as delivery assignment 122. More specifically, delivery assignment 122 is conveyed to the vehicle transporting the load of harvested crop to receiving facility 120 (e.g., truck 203 of FIG. 2). As shown in FIG. 2, delivery assignment 122 further comprises queue assignment 123. However, in at least one embodiment, queue assignment 123 is not sent. Alternatively, delivery assignment 122 and queue assignment 123 can be sent as discreet messages. In accordance with various embodiments, delivery assignment 122 is also sent to the receiving facility (e.g., receiving facility 120-1 of FIG. 2) to which the load of harvested crop is destined. In at least one embodiment, the assignment of a load of a harvested crop comprises determining which receiving facility 120 has the capacity to process the load of harvested crop in a timely manner. For example, is a load of a crop is harvested proximate to receiving facility 120-1, but that receiving facility is at capacity, or will be when the load of harvested crop is to be delivered, crop processing computer system 110 may direct the load of harvested crop to a different receiving facility. Thus, delivery assignment 122 may direct that load of harvested crop to receiving facility 120-2 which may be farther away, but has, or will have, the capacity to process that load of harvested crop when it is to be delivered. As a result, a network of receiving facilities 120 can pool their processing capacity in order to increase their efficiency and reduce spoilage or loss or harvested crops.

Additionally, various embodiments can help to detect theft, loss, and fraud in the delivery of a harvested crop to a receiving facility. For example, yield description 102 can comprise the amount of the harvested crop (e.g., as the weight of the crop, the volume of the crop, or another metric) as well as the time it was harvested. In accordance with various embodiments, this information can be compared with a measurement of the harvested crop when it is delivered to a receiving facility 120. For example, if a reporting component 101 generates a yield description 102 describing a load of 2000 pounds of cut sugarcane which is to be delivered to receiving facility 120-1, this can be compared with a report from receiving facility 120-1. Thus, if receiving facility 120-1 reports that a load of 2300 pounds of cut sugarcane was delivered, it can be surmised that the load of cut sugarcane has somehow been increased by 300 pounds from the time it was harvested to the time it arrived at a receiving facility 120. This may indicate fraud in that 300 pounds was added to the load to increase the apparent yield of that load. Similarly, if the weight of that load is only 1800 pounds, it can be surmised that 200 pounds of sugarcane was lost from the time it was harvested to the time it arrived at a receiving facility 120. This allows an operator of receiving facility 120 to determine whether a farmer, or the carrier delivering the harvested crop is, for example, mishandling harvested crops, or trying to defraud the operator.

In one or more embodiments, crop processing computer system 110 can also convey instructions to a harvester instructing it to slow down, or cease, harvesting operations until receiving facility 120 is able to process harvested crops. For example, referring still to FIG. 2, harvesting schedule 210 can be sent from crop processing computer system 100 to reporting component 101-1 conveying instructions to cease, or slow down, the harvesting of crops until another message is received. In one embodiment, this can be sent to mobile computing device 140 to an operator or supervisor of the farm where harvesting is taking place. It is noted that delivery assignment 122 can convey a variety of data. For example, crop processing computer system 110 can be configured to implement route planning for truck 203 in order to avoid known traffic congestion or other delays. Delivery assignment 122 can also provide information on where truck 203 should go to upon arrival at receiving facility 120 (e.g., which gate, where in the processing queue to go to, etc.). Upon arrival at receiving facility 120, truck 203 can be monitored with tracking systems such as RFID tracking systems and the progress of the load of harvested crop can be monitored within receiving facility 120 as well. Thus, crop processing computer system 110 can monitor the location within receiving facility 120 and its progress in the processing of the load of harvested crop. Thus, if for example a load of sugarcane is approaching a deadline for processing, crop processing computer system 110 can generate an alert 215 to receiving facility 120 indicating that the load of sugarcane needs to be prioritized and/or a deadline for processing that load. Alert 215 can also be used to inform receiving facility 120 of unanticipated events such as a delay in the shipment of a load of harvested crops, or a surge in the delivery of crops, or the like.

Example Computer System

Figure 3:
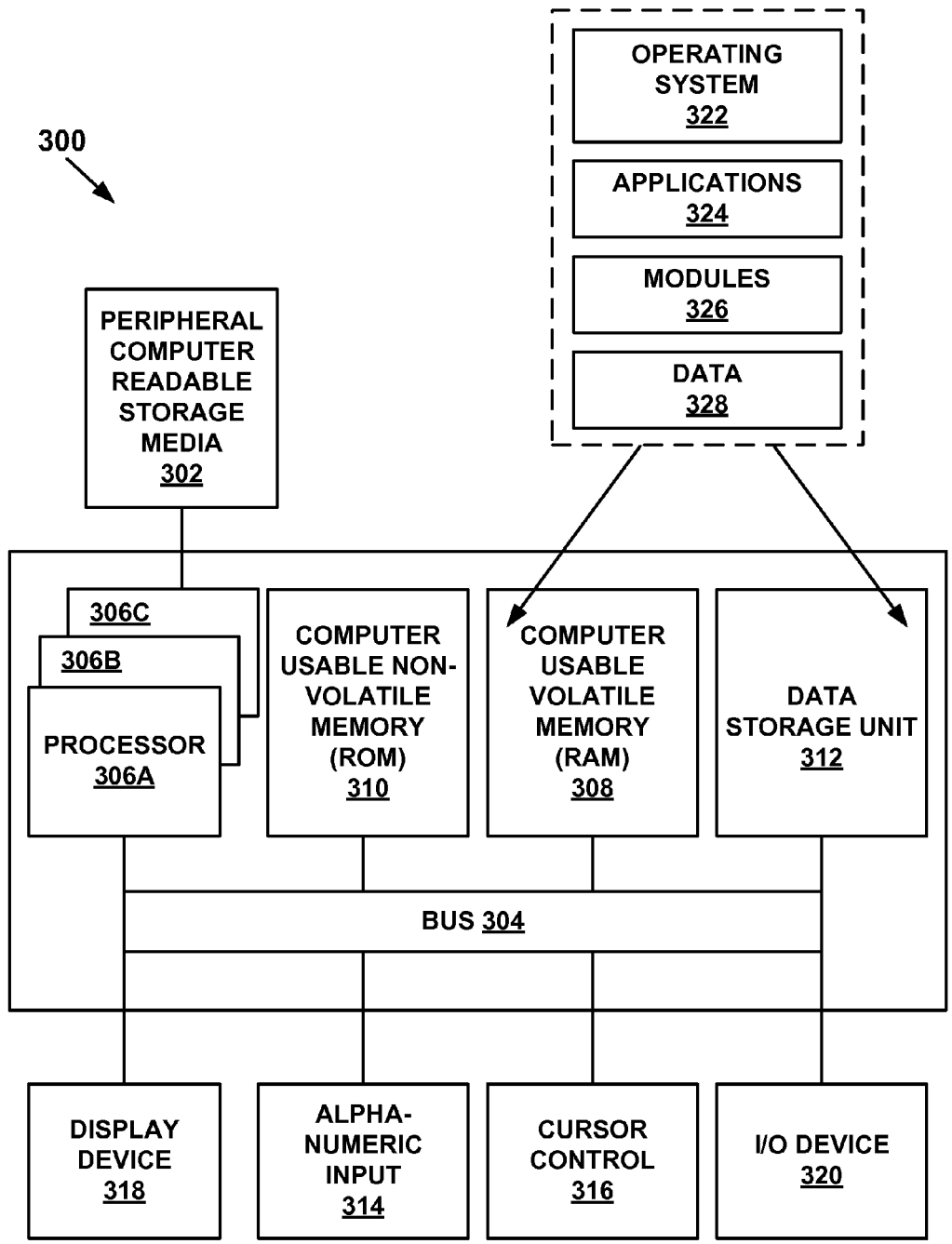
FIG. 3 is a block diagram of a crop processing computer system in accordance with various embodiments.

With reference now to FIG. 3, all or portions of some embodiments described herein are composed of computer-readable and computer-executable instructions that reside, for example, in computer-usable/computer-readable storage media of a computer system. That is, FIG. 3 illustrates one example of a type of computer (crop processing computer system 110 of FIG. 1) that can be used in accordance with or to implement various embodiments which are discussed herein. It is appreciated that computer system 300 of FIG. 3 is only an example and that embodiments as described herein can operate on or within a number of different computer systems including, but not limited to, general purpose networked computer systems, embedded computer systems, server devices, various intermediate devices/nodes, stand-alone computer systems, handheld computer systems, multi-media devices, cloud-based computing environments, and the like. Computer system 300 of FIG. 3 is well adapted to having peripheral computer-readable storage media 302 such as, for example, a floppy disk, a compact disc, digital versatile disc, universal serial bus "thumb" drive, removable memory card, and the like coupled thereto.

System 300 of FIG. 3 includes an address/data bus 304 for communicating information, and a processor 306A coupled to bus 304 for processing information and instructions. As depicted in FIG. 3, system 300 is also well suited to a multi-processor environment in which a plurality of processors 306A, 306B, and 306C are present. Conversely, system 300 is also well suited to having a single processor such as, for example, processor 306A. Processors 306A, 306B, and 306C may be any of various types of microprocessors. System 300 also includes data storage features such as a computer usable volatile memory 308, e.g., random access memory (RAM), coupled to bus 304 for storing information and instructions for processors 306A, 306B, and 306C. System 300 also includes computer usable non-volatile memory 310, e.g., read only memory (ROM), coupled to bus 304 for storing static information and instructions for processors 306A, 306B, and 306C. Also present in system 300 is a data storage unit 312 (e.g., a magnetic or optical disk and disk drive) coupled to bus 304 for storing information and instructions. System 300 also includes an optional alphanumeric input device 314 including alphanumeric and function keys coupled to bus 304 for communicating information and command selections to processor 306A or processors 306A, 306B, and 306C. System 300 also includes an optional cursor control device 316 coupled to bus 304 for communicating user input information and command selections to processor 306A or processors 306A, 306B, and 306C. In one embodiment, system 300 also includes an optional display device 318 coupled to bus 304 for displaying information.

Referring still to FIG. 3, optional display device 318 of FIG. 3 may be a liquid crystal device, cathode ray tube, plasma display device or other display device suitable for creating graphic images and alphanumeric characters recognizable to a user. Optional cursor control device 316 allows the computer user to dynamically signal the movement of a visible symbol (cursor) on a display screen of display device 318 and indicate user selections of selectable items displayed on display device 318. Many implementations of cursor control device 316 are known in the art including a trackball, mouse, touch pad, joystick or special keys on alphanumeric input device 314 capable of signaling movement of a given direction or manner of displacement. Alternatively, it will be appreciated that a cursor can be directed and/or activated via input from alphanumeric input device 314 using special keys and key sequence commands. System 300 is also well suited to having a cursor directed by other means such as, for example, voice commands System 300 also includes an I/O device 320 for coupling system 300 with external entities. For example, in one embodiment, I/O device 320 is a modem for enabling wired or wireless communications between system 300 and an external network such as, but not limited to, the Internet.

Referring still to FIG. 3, various other components are depicted for system 300. Specifically, when present, an operating system 322, applications 324, modules 326, and data 328 are shown as typically residing in one or some combination of computer usable volatile memory 308 (e.g., RAM), computer usable non-volatile memory 310 (e.g., ROM), and data storage unit 312. In some embodiments, all or portions of various embodiments described herein are stored, for example, as an application 324 and/or module 326 in memory locations within RAM 308, computer-readable storage media within data storage unit 312, peripheral computer-readable storage media 302, and/or other tangible computer readable storage media.

Example Reporting Component

Figure 4:
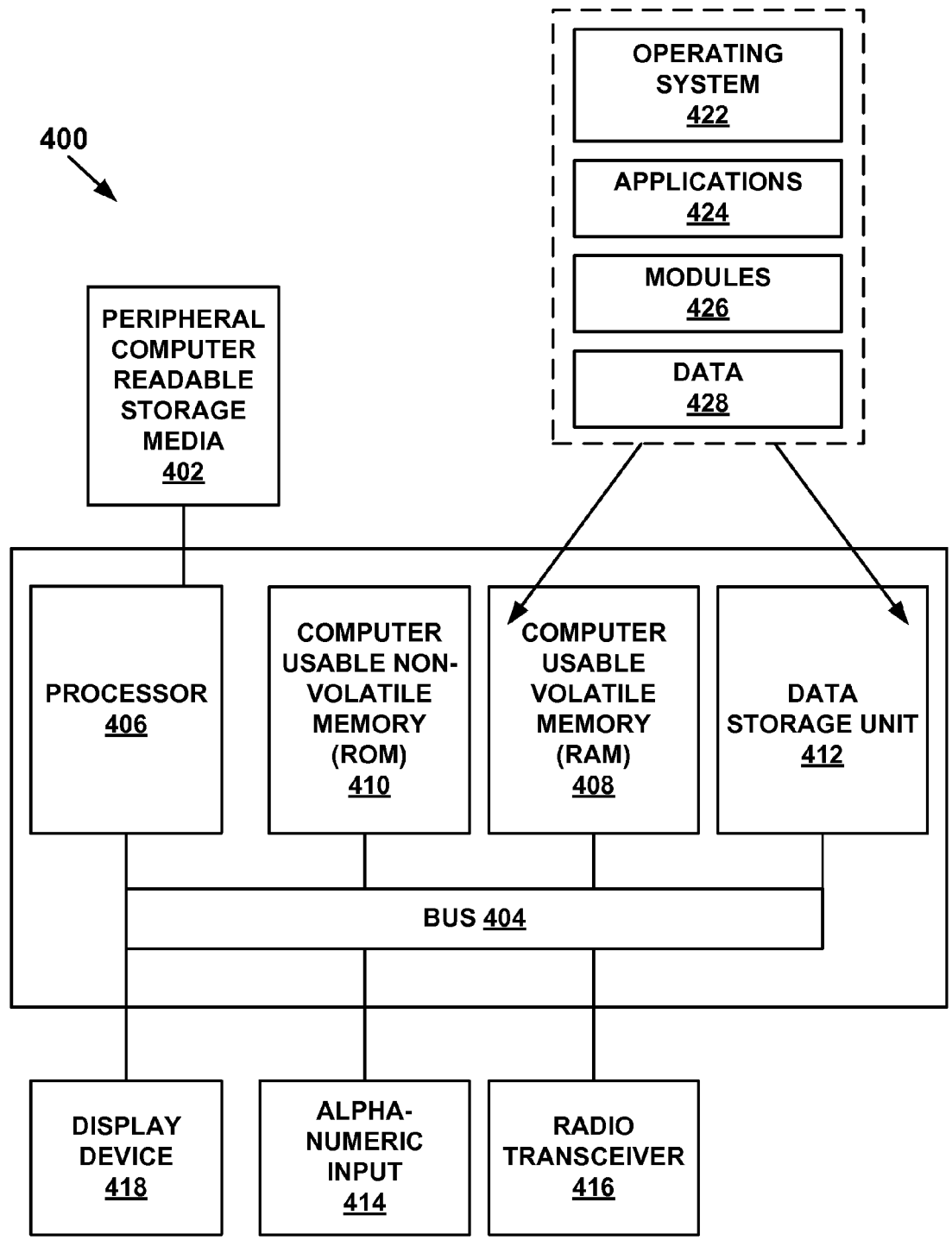
FIG. 4 is a block diagram of a reporting component of a real-time crop processing network in accordance with various embodiments.

With reference now to FIG. 4, all or portions of some embodiments described herein are composed of computer-readable and computer-executable instructions that reside, for example, in computer-usable/computer-readable storage media of a reporting component 101. That is, FIG. 4 illustrates one example of a type of reporting component 101 that can be used in accordance with or to implement various embodiments which are discussed herein. It is appreciated that computer system 400 of FIG. 4 is only an example and that embodiments as described herein can operate on or within a number of different computer systems including, but not limited to, general purpose networked computer systems, embedded computer systems, server devices, various intermediate devices/nodes, stand-alone computer systems, handheld computer systems, multi-media devices, cloud-based computing environments, and the like. Computer system 400 of FIG. 4 is well adapted to having peripheral computer-readable storage media 402 such as, for example, a floppy disk, a compact disc, digital versatile disc, universal serial bus "thumb" drive, removable memory card, and the like coupled thereto.

System 400 of FIG. 4 includes an address/data bus 404 for communicating information, and a processor 406 coupled to bus 404 for processing information and instructions. Processor 406 may be any of various types of microprocessors. System 400 also includes data storage features such as a computer usable volatile memory 408, e.g., random access memory (RAM), coupled to bus 404 for storing information and instructions for processors 406A, 406B, and 406C. System 400 also includes computer usable non-volatile memory 410, e.g., read only memory (ROM), coupled to bus 404 for storing static information and instructions for processor 406. Also present in system 400 is a data storage unit 412 (e.g., a magnetic or optical disk and disk drive) coupled to bus 404 for storing information and instructions. System 400 also includes an optional alphanumeric input device 414 including alphanumeric and function keys coupled to bus 404 for communicating information and command selections to processor 406. In one embodiment, system 400 also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alphanumeric characters recognizable to a user. A radio transceiver 416 is for communicatively coupling reporting device 101 with wireless communication network 105 and/or other reporting devices 101. As described above, radio transceiver 416 is operable to utilize any suitable wireless communication protocol including, but not limited to: WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and implementations of the Bluetooth® standard. Personal area networks refer to short-range, and often low-data-rate, wireless communications networks. Furthermore, while FIG. 4 shows a radio transceiver 416, other embodiments may utilize a radio transmitter instead.

Referring still to FIG. 4, various other components are depicted for system 400. Specifically, when present, an operating system 422, applications 424, modules 426, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer readable storage media.

FIG. 5 is a flowchart of a method 500 for managing crop processing in accordance with various embodiments. In operation 510 of FIG. 5, a yield description is received at a computer system of a load of harvested crop, and a location of the harvested crop. As described above, a reporting component 101 is configured to report metrics of a harvested crop such as a volume of harvested crop, a weight of harvested crop, a moisture content of a harvested crop, a time a crop is harvested, a location at which the crop was harvested, the content of a specific constituent (e.g., the sugar content of a crop), a condition of the harvested crop (e.g., which can be manually entered by an operator of reporting component 101, or by another component such as mobile computing device 140), etc. This information is used by crop processing computer system 110 to expedite processing of that load of crop.

In operation 520 of FIG. 5, and indication of the capacity to process the load of harvested crop by a receiving facility is received by the computer system. In accordance with various embodiments, a receiving facility can be a processing center, a storage center, a distribution center, or other facility used in the receiving, processing, storage, and distribution of a crop. As described above, a receiving facility 120 sends a processing capacity message 205 to crop processing computer system 110 which is used to determine a delivery assignment for that load of harvested crop. In one embodiment, a plurality of receiving facilities 120 send respective processing capacity messages to crop processing computer system 110. As a result, crop processing computer system 110 can determine that it is preferable to send the load of harvested crop to a second receiving facility rather than, for example, the one most proximate to the current position of the load of harvested crop. In accordance with various embodiments, crop processing computer system 110 can generate a queue assignment for the load of harvested crop which can be conveyed in, for example, delivery assignment 122.

Figure 6:
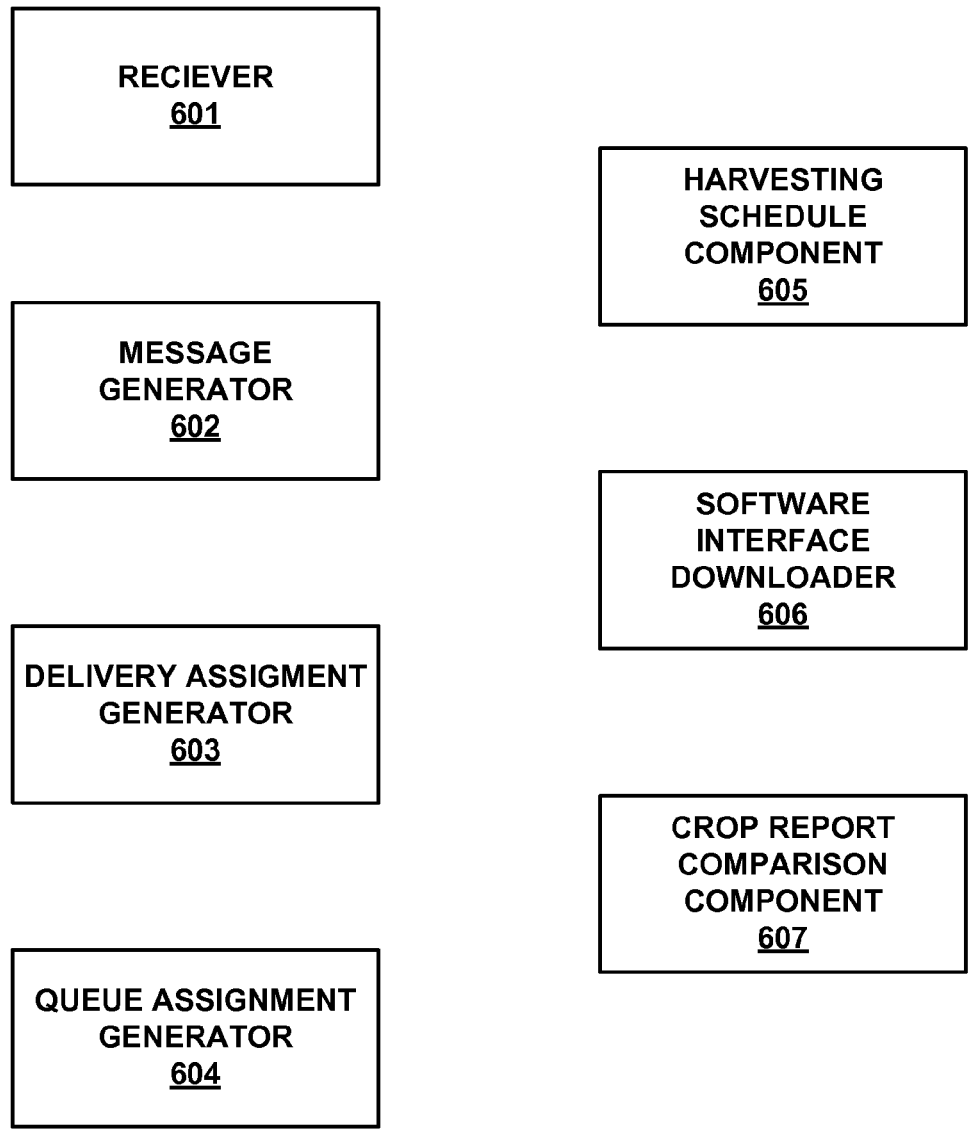
FIG. 6 shows components of a crop processing computer system in accordance with various embodiments.

In operation 530, a message is generated by the computer system conveying a delivery assignment for the load of harvested crop. In accordance with various embodiments, crop processing computer system 110 generates delivery assignment 122 which indicates the receiving facility to which the load of harvested crop will be sent. Delivery assignment 122 can also indicate a queue assignment for the load of harvested crop when it arrives at the designated receiving facility as well as other information including, but not limited to, a route to follow to deliver the load of harvested crop. In accordance with one embodiment, crop processing computer system 110 is also configured to download a software interface 130 to a mobile computing device 140 (e.g., a mobile telephone, laptop computer, tablet computer, etc.). This can facilitate manually entering, or otherwise interacting with, reporting component 101 and/or crop processing computer system 110. In accordance with various embodiments, delivery assignment 122 can be sent to mobile computing device 140 once software interface 130 has been downloaded in addition to, or instead of, sending it to a reporting component 101. In one embodiment, crop processing computer system 110 can also generate a harvesting schedule 210 (e.g., to reporting component 101 and/or mobile computing device 140). Harvesting schedule can indicate to workers in the field whether to slow down, or cease altogether, harvesting operations, or other useful information. Additionally, in various embodiments crop processing computer system 110 can detect disparities between the yield description 102 and a second description of the load of harvested crop when it arrives at the receiving facility. For example, crop report comparison component 607 of FIG. 6 is configured to compare a first yield description (e.g., generated by reporting component 101-1) with a received crop report 220 of FIG. 2. Received crop report 220 can indicate that the load of harvested crop has arrived at a designated receiving facility, the time, weight, moisture content, condition, or other metric of the load of harvested crop. In one embodiment, crop report comparison component 607 will determine whether a discrepancy between a yield description 102 and a received crop report 220 is sufficient to indicate that weight has been added to the crop (e.g., to truck 203 or a trailer towed by truck 203), or if some of the harvested crop has been removed. It has occurred in the past that an operator will add weight to the truck 203 (e.g., by filling the fuel tanks, or adding other weight) so that when the truck is weighed when it arrives at a receiving facility 120, it appears there is more crop present and therefore the load is apparently worth more than is actually the case. Alternatively, a dishonest operator can remove some the harvested crop for personal use, or to sell as his own. In either instance, crop processing computer system 110 can detect these discrepancies and generate a report, alert, or other indication.

FIG. 6 shows components of a crop processing computer system in accordance with various embodiments. Components shown in FIG. 6 include a receiver 601, a message generator 602, a delivery assignment generator 603, a queue assignment generator 604, a harvesting schedule component 605, a software interface downloader 606, and crop report comparator 607. Receiver 601 is configured to receive messages, reports, yield descriptions 102, or other data which can facilitate generating delivery assignments, queue assignments, generate messages, reports, and warnings. Message generator 602 is configured to generate messages conveying, for example, delivery assignment 122, harvesting schedule 210, alerts 215, or other messages throughout the crop processing management network. Delivery assignment generator 603 is configured to generate a delivery assignment 122 which can convey which receiving facility 120 will receive a given load of harvested crop as discussed above. In various embodiments, queue assignment generator 604 generates a queue assignment 123 which indicates where in a queue at a particular receiving facility 120 a given load of a harvested crop will go when it arrives at that receiving facility 120. In accordance with various embodiments, harvesting schedule component 605 is configured to generate a harvesting schedule 210 which indicates to workers in the field how to pace their operations such as whether to speed up, slow down, or cease altogether based at least in part upon; the processing capacity of one or more receiving facilities 120. In accordance with various embodiments, software interface downloader 606 is configured to download a software interface 130 onto a mobile computing device 140. This facilitates interacting with crop processing computer system 110 and/or one or more reporting components 101 using a device which was not originally intended for such purpose. In accordance with various embodiments, a mobile computing device 140 equipped with a software interface 130 is able to send yield descriptions 102, or processing capacity messages 205 as well as receive delivery assignments 122, queue assignments 123, harvesting schedules 210, alerts 215, and received crop reports 220. As described above, crop report comparison component 607 will determine whether a discrepancy between a yield description 102 and a received crop report 220 is sufficient to indicate that weight has been added to the crop or if some of the harvested crop has been removed. It is noted that the components described above with reference to FIG. 6 can be implemented as software modules executed by processor 306A and/or 306B and 306C in a multi-processor implementation, dedicated hardware components of crop processing computer system 110, computer firmware of crop processing computer system 110, or a combination thereof.

Embodiments of the present technology are thus described. While the present technology has been described in particular embodiments, it should be appreciated that the present technology should not be construed as limited to these embodiments alone, but rather construed according to the following claims.

What is claimed is:

1. A method for managing crop processing in real-time, the method comprising:

receiving, by a computing device and via a wireless communication network, a yield description of a load of harvested crop, wherein the yield description includes one or more of a volume of harvested crop, a weight of harvested crop, a moisture content of harvested crop, a harvest time of harvested crop, a condition of harvested crop, or a constituent content of harvested crop, and wherein receiving the yield description occurs prior to the load of harvested crop arriving at a receiving facility;

receiving, by the computing device, a location of the load of harvested crop while the harvested crop is en-route to a receiving facility of a plurality of receiving facilities;

receiving, by the computing device, one or more processing capacity messages providing indications of abilities of the plurality of receiving facilities to timely process the load of harvested crop, wherein the processing capacity messages identify an amount of crop received at the receiving facility and a priority order for processing the received amount of crop;

determining, by the computing device and using the processing capacity messages, that a processing capacity of a most proximal receiving facility of the plurality of receiving facilities is insufficient to timely process the load of harvested crop, wherein the most proximal receiving facility is closest in proximity to the location of the load of harvested crop;

generating, by the computing device, a delivery assignment for the load of harvested crop using the yield description, the location, and the one or more processing capacity messages, wherein generating includes identifying that a particular receiving facility of the plurality of receiving facilities has a sufficient capacity to timely process the harvested crop to facilitate reducing spoilage or loss of the load of harvested crop, wherein the delivery assignment identifies the particular receiving facility, and wherein the particular receiving facility is different from the most proximal receiving facility;

generating, by the computing device, a delivery assignment message including the delivery assignment for the load of harvested crop;

transmitting, by the computing device, the delivery assignment message for receipt by one or more of:
the particular receiving facility and
the wireless communication network for conveying the delivery assignment message to a reporting component associated with the load of harvested crop;

generating, by the computing device, a queue assignment for the load of harvested crop at the particular receiving facility based on a time-sensitivity for processing the load of harvested crop, wherein the queue assignment corresponds to a processing number in a processing queue of the particular receiving facility, wherein the processing queue identifies an order for which crops assigned to the queue are to be processed, and wherein the queue assignment indicates that the load of harvested crop is to be queued at the front of the processing queue in order for the harvested crop to be processed before a processing deadline;

monitoring, by the computing device, the location of the load of harvested crop within the particular receiving facility in order to identify progress in processing of the load of harvested crop;

determining, by the computing device, that the load of harvested crop is approaching the processing deadline; and generating, by the computing device, an alert, wherein the alert indicates the processing deadline or wherein the alert indicates that the load of harvested crop is to be prioritized.

2. The method of claim 1, further comprising:
processing, by the particular processing facility, the load of harvested crop prior to the processing deadline.

3. The method of claim 1, wherein generating the delivery assignment message comprises generating a harvesting schedule for the crop using the one or more processing capacity messages, wherein the harvesting schedule includes instructions to slow down or cease harvesting operations; and
wherein transmitting the delivery assignment message includes transmitting the harvesting schedule to the wireless communication network.

4. The method of claim 3, further comprising:
downloading a software interface from a software interface downloader of the computing device to a mobile computing device; and
conveying the delivery assignment to the software interface.

5. The method of claim 3, further comprising:
slowing down or ceasing, by a harvester machine, harvesting operations according to the harvesting schedule.

6. The method of claim 1, further comprising:
receiving, by the computing device and from the particular receiving facility, a received crop report, wherein the received crop report identifies one or more of an indicator that the load of harvested crop has arrived at the particular receiving facility, a time that the load of harvested crop arrived at the particular receiving facility, a weight of the load of harvested crop that has arrived at the particular receiving facility, a moisture content of the load of harvested crop that has arrived at the particular receiving facility, and a condition of the load of harvested crop that has arrived at the particular receiving facility.

7. The method of claim 6, further comprising:
identifying, by the computing device, a discrepancy between the yield description and the received crop report; and
generating an indication of the discrepancy.

8. A non-transitory computer-readable storage medium comprising computer executable code for directing a processor to execute operations comprising:
receiving, at a computer system comprising the processor and via a wireless communication network, a yield description of a load of harvested crop, wherein the yield description includes one or more of a volume of harvested crop, a weight of harvested crop, a moisture content of harvested crop, a harvest time of harvested crop, a condition of harvested crop, or a constituent content of harvested crop, and wherein receiving the yield description occurs prior to the load of harvested crop arriving at a receiving facility;
receiving, by the computer system, a location of the load of harvested crop while the harvested crop is en-route to a receiving facility of a plurality of receiving facilities;
receiving, by the computer system, one or more processing capacity messages providing indications of abilities of the plurality of receiving facilities to timely process the load of harvested crop, wherein the processing capacity messages identify an amount of crop received at the receiving facility and a priority order for processing the received amount of crop;
determining, by the computer system and using the processing capacity messages, that a processing capacity of a most proximal receiving facility of the plurality of receiving facilities is insufficient to timely process the load of harvested crop, wherein the most proximal receiving facility is closest in proximity to the location of the load of harvested crop;
generating, by the computer system, a delivery assignment for the load of harvested crop using the yield description, the location, and the one or more processing capacity messages, wherein generating includes identifying that a particular receiving facility of the plurality of receiving facilities has a sufficient capacity to timely process the harvested crop to facilitate reducing spoilage or loss of the harvested crop, wherein the delivery assignment identifies the particular receiving facility, and wherein the particular receiving facility is different from the most proximal receiving facility;
generating, by the computer system, a delivery assignment message including the delivery assignment for the load of harvested crop;

transmitting, by the computer system, the delivery assignment message for receipt by one or more of:
the particular receiving facility and
the wireless communication network for conveying the delivery assignment message to a reporting component associated with the load of harvested crop;
generating, by the computer system, a queue assignment for the load of harvested crop at the particular receiving facility based on a time-sensitivity for processing the load of harvested crop, wherein the queue assignment corresponds to a processing number in a processing queue of the particular receiving facility, wherein the processing queue identifies an order for which crops assigned to the queue are to be processed, and wherein the queue assignment indicates that the load of harvested crop is to be queued at the front of the processing queue in order for the harvested crop to be processed before a processing deadline;
monitoring, by the computer system, the location of the load of harvested crop within the particular receiving facility in order to identify progress in processing of the load of harvested crop;
determining, by the computer system, that the load of harvested crop is approaching the processing deadline; and
generating, by the computer system, an alert, wherein the alert indicates the processing deadline or wherein the alert indicates that the load of harvested crop is to be prioritized.

9. The non-transitory computer-readable storage medium claim 8, wherein the operations further comprise:
transmitting, by the computer system, instructions to process the load of harvested crop prior to the processing deadline, wherein receiving the instructions at the particular processing facility facilitates processing the load of harvested crop prior to the processing deadline.

10. The non-transitory computer-readable storage medium of claim 8, wherein generating the delivery assignment comprises generating a harvesting schedule for the crop using the one or more processing capacity messages, wherein the harvesting schedule includes instructions to slow down or cease harvesting operations; and
wherein transmitting the delivery assignment message includes transmitting the harvesting schedule to the wireless communication network.

11. The non-transitory computer-readable storage medium of claim 10, wherein the operations further comprise:
downloading a software interface from the computer system to a mobile computing device; and
conveying the delivery assignment to the software interface.

12. The non-transitory computer-readable storage medium of claim 10, wherein the operations further include:
transmitting, by the computer system, instructions for a harvester machine to slow down or cease harvesting operations according to the harvesting schedule, wherein receiving the instructions at the harvester machine causes the harvester machine to slow down or cease harvesting operations according to the harvesting schedule.

13. The non-transitory computer-readable storage medium of claim 8, wherein the operations further comprise:
receiving, by the computer system and from the particular receiving facility, a received crop report, wherein the received crop report identifies one or more of an indicator that the load of harvested crop has arrived at the particular receiving facility, a time that the load of harvested crop arrived at the particular receiving facility, a weight of the load of harvested crop that has arrived at the particular receiving facility, a moisture content of the load of harvested crop that has arrived at the particular receiving facility, and a condition of the load of harvested crop that has arrived at the particular receiving facility.

14. The non-transitory computer-readable storage medium of claim 13, wherein the operations further comprise
identifying, by the computer system, a discrepancy between the yield description and the received crop report; and
generating an indication of the discrepancy.

15. A crop processing management system comprising:
one or more processors;
a network transceiver in data communication with the one or more processors and a wireless communication network; and
a non-transitory computer readable storage medium comprising instructions that, when executed by the one or more processors, cause the one or more processors to perform operations including:
receiving, using the network transceiver and via the wireless communication network, a yield description of a load of harvested crop, wherein the yield description includes one or more of a volume of harvested crop, a weight of harvested crop, a moisture content of harvested crop, a harvest time of harvested crop, a condition of harvested crop, or a constituent content of harvested crop, and wherein receiving the yield description occurs prior to the load of harvested crop arriving at a receiving facility;
receiving a location of the load of harvested crop while the harvested crop is en-route to a receiving facility of a plurality of receiving facilities;
receiving, using the network transceiver, one or more processing capacity messages providing indications of abilities of the plurality of receiving facilities to timely process the load of harvested crop, wherein the processing capacity messages identify an amount of crop received at the receiving facility and a priority order for processing the received amount of crop;
determining, using the processing capacity messages, that a processing capacity of a most proximal receiving facility of the plurality of receiving facilities is insufficient to timely process the load of harvested crop, wherein the most proximal receiving facility is closest in proximity to the location of the load of harvested crop;
generating a delivery assignment for the load of harvested crop using the yield description, the location, and the one or more processing capacity messages, wherein generating includes identifying that a particular receiving facility of the plurality of receiving facilities has a sufficient capacity to timely process the harvested crop to facilitate reducing spoilage or loss of the harvested crop, wherein the delivery assignment identifies the particular receiving facility, and wherein the particular receiving facility is different from the most proximal receiving facility;
generating a delivery assignment message including the delivery assignment for the load of harvested crop;
transmitting, using the network transceiver, the delivery assignment message for receipt by one or more of:

the particular receiving facility and
the wireless communication network for conveying the delivery assignment message to a reporting component associated with the load of harvested crop;
generating a queue assignment for the load of harvested crop at the particular receiving facility based on a time-sensitivity for processing the load of harvested crop, wherein the queue assignment corresponds to a processing number in a processing queue of the particular receiving facility, wherein the processing queue identifies an order for which crops assigned to the queue are to be processed, and wherein the queue assignment indicates that the load of harvested crop is to be queued at the front of the processing queue in order for the harvested crop to be processed before a processing deadline;
monitoring the location of the load of harvested crop within the particular receiving facility in order to identify progress in processing of the load of harvested crop;
determining that the load of harvested crop is approaching the processing deadline; and
generating an alert, wherein the alert indicates the processing deadline or wherein the alert indicates that the load of harvested crop is to be prioritized.

16. The crop processing management system of claim 15, wherein the operations further include:
transmitting instructions to process the load of harvested crop prior to the processing deadline, wherein receiving the instructions at the particular processing facility facilitates processing the load of harvested crop prior to the processing deadline.

17. The crop processing management system of claim 15, wherein generating the delivery assignment message comprises generating a harvesting schedule for the crop using the one or more processing capacity messages, wherein the harvesting schedule includes instructions to slow down or cease harvesting operations; and
wherein transmitting the delivery assignment message includes transmitting the harvesting schedule to the wireless communication network using the network transceiver.

18. The crop processing management system of claim 17, wherein the operations further include:
downloading a software interface from to a mobile computing device using the network transceiver; and
conveying the delivery assignment to the software interface.

19. The crop processing management system of claim 17, wherein the operations further include:
transmitting instructions for a harvester machine to slow down or cease harvesting operations according to the harvesting schedule, wherein receiving the instructions at the harvester machine causes the harvester machine to slow down or cease harvesting operations according to the harvesting schedule.

20. The crop processing management system of claim 15, wherein the operations further include:
receiving, using the network transceiver, a received crop report, wherein the received crop report identifies one or more of an indicator that the load of harvested crop has arrived at the particular receiving facility, a time that the load of harvested crop arrived at the particular receiving facility, a weight of the load of harvested crop that has arrived at the particular receiving facility, a moisture content of the load of harvested crop that has arrived at the particular receiving facility, and a condition of the load of harvested crop that has arrived at the particular receiving facility;
identifying a discrepancy between the yield description and the received crop report; and
generating an indication of the discrepancy.

* * * * *